US011354680B2

(12) United States Patent
Astvatsaturov et al.

(10) Patent No.: US 11,354,680 B2
(45) Date of Patent: Jun. 7, 2022

(54) SYSTEMS AND METHODS FOR IDENTIFYING POTENTIAL SHRINK EVENTS

(71) Applicant: ZEBRA TECHNOLOGIES CORPORATION, Lincolnshire, IL (US)

(72) Inventors: Yuri Astvatsaturov, Lake Forest, IL (US); Raymond Terry Durham, Summers, AR (US)

(73) Assignee: Zebra Technologies Corporation, Lincolnshire, IL (US)

( * ) Notice: Subject to any disclaimer, the term of this patent is extended or adjusted under 35 U.S.C. 154(b) by 231 days.

(21) Appl. No.: 16/856,913

(22) Filed: Apr. 23, 2020

(65) Prior Publication Data

US 2021/0334824 A1    Oct. 28, 2021

(51) Int. Cl.
| | | |
|---|---|---|
| *G06Q 30/00* | (2012.01) | |
| *G06Q 10/08* | (2012.01) | |
| *G01D 5/12* | (2006.01) | |
| *G08B 21/18* | (2006.01) | |
| *G06K 7/10* | (2006.01) | |
| *G08B 5/22* | (2006.01) | |

(52) U.S. Cl.
CPC .......... *G06Q 30/0185* (2013.01); *G01D 5/12* (2013.01); *G06K 7/10366* (2013.01); *G06Q 10/087* (2013.01); *G08B 21/182* (2013.01); *G08B 5/22* (2013.01)

(58) Field of Classification Search
CPC .... G06Q 30/0185; G06Q 10/087; G01D 5/12; G06K 7/10366; G08B 21/182; G08B 5/22; G08B 13/2417; G08B 13/2462

USPC .......................................................... 705/28
See application file for complete search history.

(56) References Cited

U.S. PATENT DOCUMENTS 10,140,829 B1    11/2018  Calvarese et al.
10,319,204 B1     6/2019  Wulff
(Continued)

FOREIGN PATENT DOCUMENTS

CN        103753977 A  *  4/2014  .............. B41J 15/04
WO   WO-2016053647 A1  *  4/2016  ......... G08B 13/2402

OTHER PUBLICATIONS

International Search Report and Written Opinion for International Application No. PCT/US2021/28078 dated Jul. 27, 2021.

*Primary Examiner* — Russell S Glass (57) ABSTRACT

Systems and methods for detecting potential shrink events within a venue are provided. The example systems include, a plurality of RFID readers disposed throughout the venue and a controller operatively coupled to the plurality of RFID readers. The controller includes a processor and a non-transitory machine-readable memory storing machine-readable instructions that, when executed by the at least one processor, cause the example systems to (1) monitor RFID tag data associated with an RFID tag disposed within an environment, the RFID tag data including an environmental metric associated with at least a portion of the environment; and (2) responsive to a change in the RFID tag data exceeding a predetermined threshold, generate an alert indicative of a potential shrink event. The change in the RFID tag data may include a change in the environmental metric resulting from a positioning of the RFID tag relative to a body of an individual.

22 Claims, 5 Drawing Sheets

(56) References Cited

U.S. PATENT DOCUMENTS

| | | | | |
|---|---|---|---|---|
| 2003/0216969 A1* | 11/2003 | Bauer | ................... | G06K 17/00 |
| | | | | 705/22 |
| 2008/0243626 A1* | 10/2008 | Stawar | ................ | G06Q 20/208 |
| | | | | 705/23 |
| 2013/0144757 A1 | 6/2013 | Bauer et al. | | |
| 2016/0093182 A1* | 3/2016 | Turgeon | ............ | G08B 13/2402 |
| | | | | 340/572.1 |
| 2019/0311592 A1 | 10/2019 | Wulff | | |

* cited by examiner

SYSTEMS AND METHODS FOR IDENTIFYING POTENTIAL SHRINK EVENTS

BACKGROUND

Shrink events occur when a retail venue loses product, typically due to theft. Accordingly, many retail venues implement security measures in order to help prevent shrink events. These techniques typically rely on imaging analyses to detect the shrink event.

As the retail environment has developed, many products are now associated with radio frequency identification (RFID) tags that are tracked by a corresponding RFID network at various venues. Accordingly, there is a need for systems and methods that can take advantage of these advancements and identify potential shrink events.

SUMMARY

In an embodiment, the present invention is a radio frequency (RF) identification (RFID) tracking system for detecting potential shrink events within a venue. The RFID tracking system includes (i) a plurality of RFID readers disposed throughout the venue; and (ii) a controller operatively coupled to the plurality of RFID readers. The controller includes at least one processor and at least one non-transitory machine-readable memory storing machine-readable instructions that, when executed by the at least one processor, cause the RFID tracking system to (1) monitor RFID tag data associated with an RFID tag disposed within an environment and affixed to an object, the RFID tag data including an environmental metric associated with at least a portion of the environment; and (2) responsive to a change in the RFID tag data exceeding a predetermined threshold, generate an alert indicative of a potential shrink event, wherein the change in the RFID tag data includes a change in the environmental metric resulting from a positioning of the RFID tag relative to a body of an individual.

In an embodiment, the present invention is a radio frequency (RF) identification (RFID) tracking system for detecting potential shrink events within a venue. The RFID tracking system includes (i) a plurality of RFID readers disposed throughout the venue; and (ii) a controller operatively coupled to the plurality of RFID readers. The controller includes at least one processor and at least one non-transitory machine-readable memory storing machine-readable instructions that, when executed by the at least one processor, cause the RFID tracking system to (1) monitor RFID tag data associated with an RFID tag disposed within an environment and affixed to an object, the RFID tag data including temperature data associated with at least a portion of the environment; and (2) responsive to a change in the RFID tag data exceeding a predetermined threshold, generate an alert indicative of a potential shrink event, wherein the change in the RFID tag data includes a change in the temperature data resulting from a positioning of the RFID tag relative to a body of an individual.

In another embodiment, the present invention is a method of tracking radio frequency identification (RFID) tags at a venue having a plurality of RFID readers disposed throughout the venue by a controller operatively coupled to the plurality of RFID readers. The method includes (1) monitoring, by a processing platform, RFID tag data associated with an RFID tag disposed within an environment and affixed to an object, the RFID tag data including an environmental metric associated with at least a portion of the environment; (2) detecting, by a processing platform, a change in the RFID tag data resulting from a positioning of the RFID tag relative to a body of an individual; (3) responsive to the change exceeding a predetermined threshold, generating, by a processing platform, an alert indicative of a potential shrink event.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
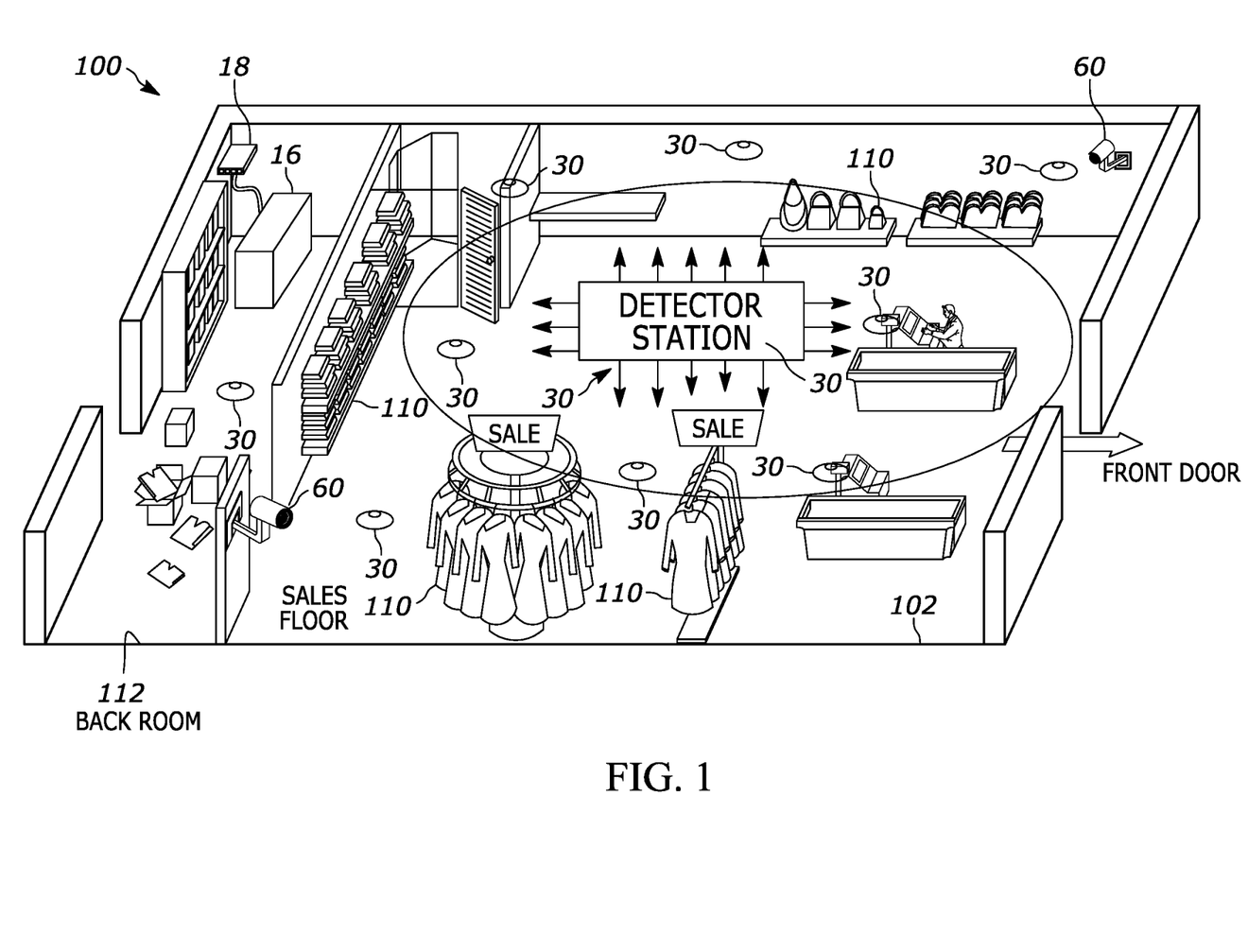
FIG. 1 illustrates an example venue that includes the RFID tracking system disclosed herein.

FIG. 1 is a perspective view, as seen from above, of a venue 100 illustrating an arrangement for which a Radio Frequency Identification (RFID) tracking system within the venue 100 is deployed to facilitate tracking objects 110 within the venue. Although the example venue 100 is a retail venue, other types of venues (such as an airport, a stadium, a performance center, a museum, and so on) are envisioned In the example embodiment of FIG. 1, the venue 100 includes a backroom 112 that has a centralized controller 16. In other embodiments, the centralized controller 16 may be located off-venue. The centralized controller 16 may be operated by store personnel and/or personnel associated with the RFID tracking system.

The centralized controller 16 may comprise a networked host computer or server. The centralized controller 16 may be connected to a plurality of detector stations 30 positioned throughout the venue 100 via the network switch 18. As further described herein, the detector stations 30 include RFID readers that are able to detect RFID tags (not depicted) that are affixed to objects 110 (such as clothing, books, toys, or any product or other object available for purchase at a venue). The detector stations 30 may include other sensors in addition to the RFID readers, for example, image sensors, ultrasonic sensors, etc. In some embodiments, in addition to any image sensors included in the detector stations 30, the example venue 100 may include one or more dedicated image sensors 60 configured to capture image data representative of various locations of the venue 100.

Each of the detector stations 30 and the image sensors 60 may either be in either wired or wireless electronic communication with centralized controller 16 via the network switch 18. For example, in some embodiments, the detector stations 30 and the image sensors 60 may be connected via Category 5 or 6 cables and use the Ethernet standard for wired communications. In other embodiments, the detector stations 30 and the image sensors 60 may be connected wirelessly, using built-in wireless transceiver, and may use the IEEE 802.11 (WiFi) and/or Bluetooth standards for wireless communications. Other embodiments may include detector stations 30 and image sensors 60 that use a combination of wired and wireless communication. As the objects 110 are picked up by individuals, the detector stations 30 relay positioning information of the objects 110 (and/or the RFID tags affixed thereto) to the centralized controller 16. Accordingly, the centralized controller 16 is able to track the position of the objects 110 as they are carried throughout the venue.

If an individual is attempting to steal a particular object 110, the motion of the particular object 110 may be insufficient to distinguish the particular object 110 from other objects 110 the individual may otherwise be carrying for purchase. Accordingly, traditional RFID tracking systems may be insufficient to detect the potential shrink event. Instead, in embodiments disclosed herein, the RFID tags affixed to the objects 110 may be adapted to include one or more sensors capable of sensing the environment proximate to the RFID tag. Accordingly, by capturing this environmental sensor data via the RFID readers of the detector stations 30, the centralized controller 16 is able to identify and distinguish potential shrink events from objects that are legitimately picked up for purchase.

Figure 2A:
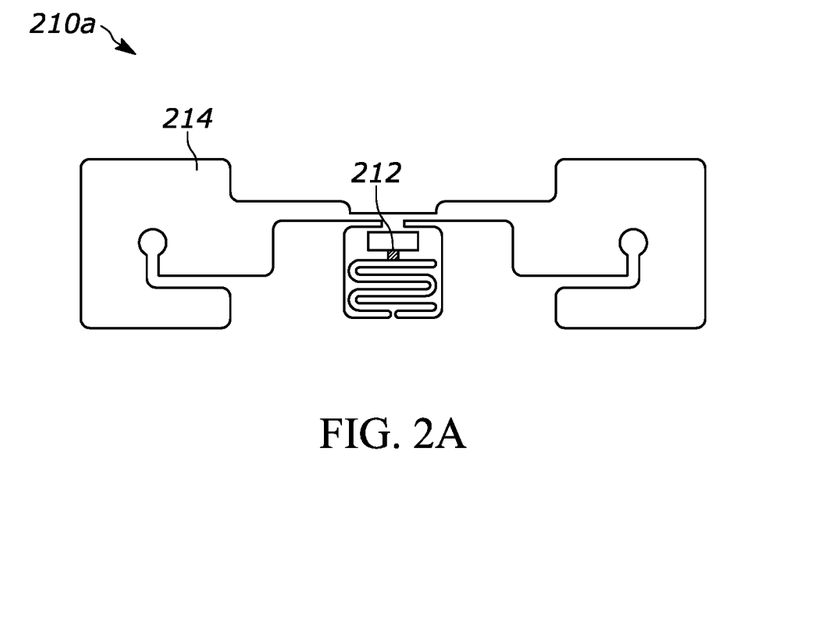
FIGS. 2A and 2B illustrate example RFID tags for use with the RFID tracking system.
Figure 2B:
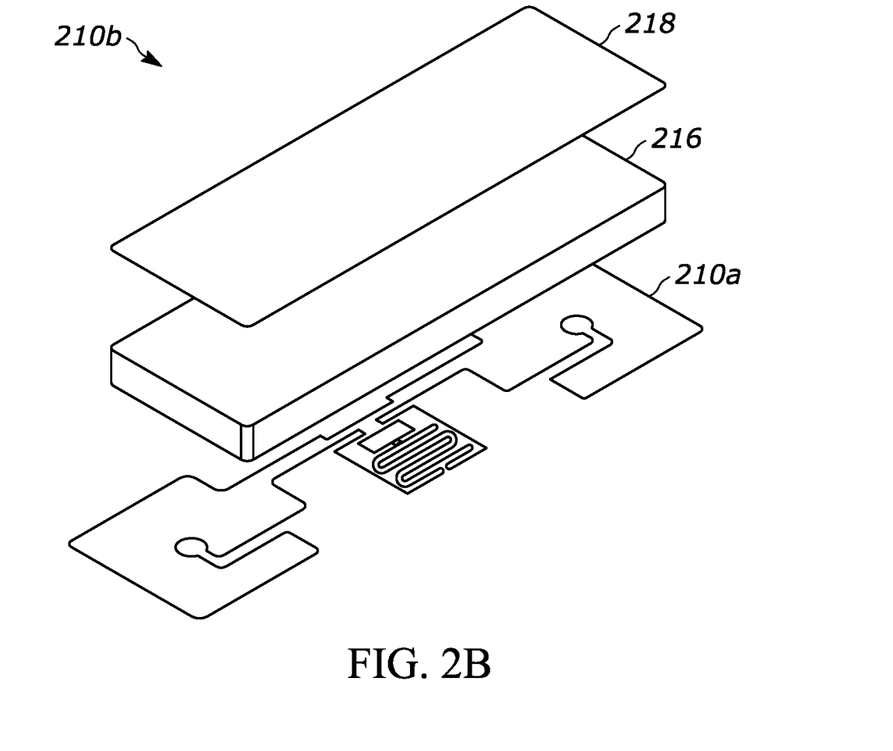

FIGS. 2A and 2B illustrate example RFID tags 210 for use with the RFID tracking system implemented at the venue 100. As illustrated in FIG. 2A, the RFID tag 210a includes an integrated circuit (IC) 212 and an antenna 214. While FIGS. 2A and 2B depict the antenna 214 as a dog-bone antenna, the RFID tag 210a may include other antenna shapes. The IC 212 may be configured to control transmission and/or reception characteristics of the antenna 214. As one example, the IC 212 may tune the antenna 214 to a frequency that matches the frequency used by an RFID reader of a detector station 30. In this example, the IC 212 and/or the antenna 214 may include a programmable capacitor, the capacitance of which is controlled by the IC 212 to cause the antenna to be tuned to the frequency sensed by the antenna 212.

When moisture is near an antenna, the water molecules interact with the radio waves. Accordingly, the antenna 214 becomes detuned in the presence of moisture. Similarly, if the antenna 214 is in the presence of metal object, the metal object also detunes the antenna 212. This detuning effect is generally referred as an "dielectric" effect. Thus, the IC 212 may be configured to detect environmental dielectric effect detuning and correspondingly adjust the programmable capacitor to exhibit a new capacitance value such that the frequency of the antenna 214 still matches the sensed frequency. By measuring the magnitude of this shift in capacitance, the IC 212 is able to determine an amount by which the dielectric effect detuned the antenna 214.

When an individual picks up a particular object 110, the RFID tag 210a is able to sense the dialectic effect caused by the individual's body. In some scenarios, the dielectric effect is caused by moisture on his or her skin. Additionally or alternatively, the dielectric effect may be caused by the body's mass detuning the antenna 214. Because shrink often occurs when an individual hides an object under his or her clothes, and thus the increasing the dielectric effect imposed by the individual's body on the antenna 214, detecting a threshold shift in the dielectric effect sensed in the environment proximate to the RFID tag 210a may indicate a potential shrink event.

As another example, the IC 212 may include a temperature sensor to sense a temperature of the environment proximate to the RFID tag 210a. In many scenarios, the human body is warmer than the ambient temperature of the venue 100. Accordingly, if an individual attempts to hide a particular object 110 under their clothes, heat radiated from the individual's body may be sensed by the temperature sensor of the IC 212, thereby raising the temperature metric sensed by the IC 212. Thus, in some embodiments, the IC 212 detecting a threshold shift in temperature sensed for the environment proximate to the RFID tag 210a indicates a potential shrink event.

As shown in FIG. 2B, the RFID tag 210a of FIG. 2A may be adapted to also be a pressure sensing RFID tag 210b. In the illustrated embodiment, the RFID tag 210b leverages the dielectric effect to detect a pressure applied to the RFID tag 210b. Accordingly, the RFID tag 210b also includes a metallic layer 218 disposed on top of a compressive layer 216, such as a layer made from foam, rubber, or other compressible material. When a pressure is exerted on metallic layer 218, the compressive layer 216 compresses by an amount proportional to the compressivity of the compressive layer 216. As a result, the metallic layer 218 is closer to the antenna 214 of the RFID tag 210a. As described above, the proximity of the metallic layer 218 to the antenna 214 detunes the antenna 214. Accordingly, by measuring the dielectric effect imposed by the metallic layer 218, the IC 212 is able to sense a pressure applied to the RFID tag 212b. Because shrink events frequently occur when an individual places a particular object 110 in a constrained environment (e.g., under his or her clothes, in a pocket, etc.), a sustained shift in pressure beyond a threshold amount, in some embodiments, indicates a potential shrink event.

Although not illustrated, the RFID tag 210 may include a memory at which the IC 212 writes the sensed temperature, pressure, and/or dielectric data. In some embodiments, the memory is included in the IC 212. Accordingly, an RFID reader of a detector station 30 may transmit a query to the RFID tag 210 to obtain the sensor data stored thereat. Upon detecting the query, the IC 212 may determine the particular sensor value(s) indicated by the query, read the indicated value(s) from the memory, and transmit the value(s) back to the RFID reader. The corresponding detector station 30 may then route the sensor data (along with any other RFID tag data) to the centralized controller 16 for processing to identify potential shrink events.

Figure 3:
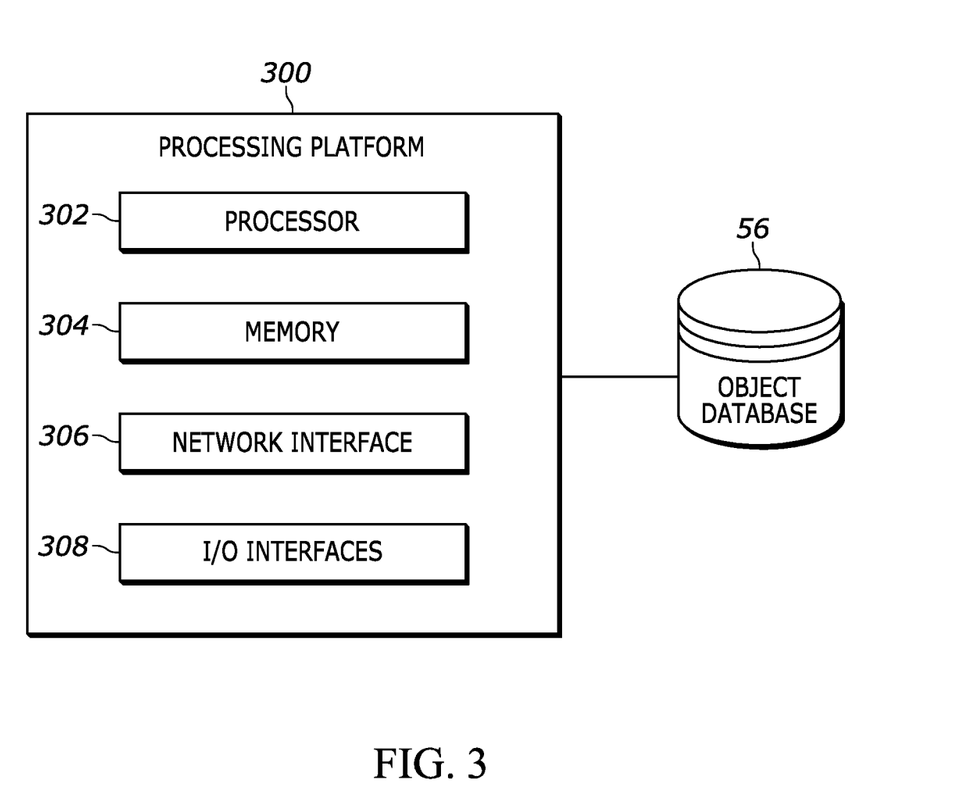
FIG. 3 is a block diagram representative of an example logic circuit capable of implementing, for example, the controller of the RFID tracking system.

FIG. 3 is a block diagram representative of an example logic circuit capable of implementing, for example, the controller 16 of the RFID tracking system associated with the venue 100 of FIG. 1. The example logic circuit of FIG. 3 is a processing platform 300 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 300 of FIG. 3 includes a processor 302 such as, for example, one or more microprocessors, controllers, and/or any suitable type of processor. The example processing platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 300 to provide access to the machine-readable instructions stored thereon.

The example processing platform 300 of FIG. 3 also includes a network interface 306 to enable communication with other machines via, for example, one or more networks. The example network interface 306 includes any suitable type of communication interface(s) (e.g., wired and/or wireless interfaces) configured to operate in accordance with any suitable protocol(s).

The example processing platform 300 of FIG. 3 also includes input/output (I/O) interfaces 1108 to enable receipt of user input and communication of output data to the user.

As illustrated, the example processing platform 300 of FIG. 3 interfaces with an object database 56 configured to store current information associated with one or more objects 110 at the venue 100. For a particular object, the object database 56 may store an object identifier associated with the object, a position of the object at the venue, current image data representative of the object, reference image data representative of the object, most recent sensor values obtained from an RFID tag 210 affixed to the object, baseline sensor values, and/or other information associated with the object and/or RFID tag 210 affixed thereto. In some embodiments, at least a portion of the object database 56 is stored at the memory 304 of the example processing platform 300. Additionally or alternatively, at least a portion of the object database 56 is maintained at an external memory (e.g., a cloud memory storage unit).

In some embodiments, the processing platform 300 obtains RFID tag data from RFID tags 210 disposed within the venue 100. More particularly, the processing platform 300 obtains the RFID tag data from the RFID tags 210 from serving detector stations 30 via the network interface 306. The example processing platform 300 then updates the object database 56 based on the obtained RFID tag data. For example, the example processing platform 300 may determine a historical baseline sensor value by determining a steady state sensor value when the object is at rest. As another example, the processing platform 300 may compare current sensor values included in the RFID tag data to the historical baseline sensor value to detect a change in the RFID tag data. In this example, if the example processing platform 300 determines that the change exceeds a predetermined threshold, the example processing platform 300 may identify the object as being associated with a potential shrink event and generate an alert.

For example, in one scenario, the ambient temperature is 65 degrees Fahrenheit. When an individual places the object 110 in his or her pocket, the temperature sensed by the RFID tag 210 may be higher than the ambient temperature (e.g., 70 degrees Fahrenheit, 75 degrees Fahrenheit, 80 degrees Fahrenheit etc.). Accordingly, the processing platform 300 may set the threshold change to be 2.5 degrees Fahrenheit, 5 degrees Fahrenheit, etc. Thus, when the processing platform 300 detects that the temperature value obtained from the RFID tag 210 changed by more than the threshold change, the processing platform 300 may trigger an alert indicating the potential shrink event. It should be appreciated that the term "exceed" as it is generally used herein is not limited to referring to an upper bound. In some scenarios, the change may exceed a threshold by dropping below a lower bound. In some embodiments, the processing platform 300 determines that the threshold change in temperature occurs for a threshold amount of time (e.g., 30 seconds, 45 seconds, 1 minute, 2 minutes, etc.) before triggering the alert.

It should be appreciated the example processing platform 300 is configured to identify "potential" shrink events. That is, despite the improved capacity to detect shrink events, in some scenarios, the change in RFID tag data cannot conclusively determine that a shrink event is occurring. For example, placing a hot object (e.g., a rotisserie chicken) near the RFID tag 210 may be the source of the change in the RFID tag data, and not the relative position of the RFID tag 210 to the body of an individual carrying the object. Accordingly, the generated alert may be configured to initiate a secondary analysis of the object to more conclusively determine the presence of a shrink event.

In some embodiments, the memory 304 of the example processing platform 300 may include one or more venue monitoring applications. For example, the memory 304 may include a video surveillance application. Accordingly, the alert may trigger the I/O interface 308 to present a video feed from an imaging sensor 60 and/or an imaging sensor of a detector station 30 arranged to capture image data of the current position of the RFID tag 210 as determined based upon the RFID tag data. As another example, the memory 304 may include a mapping application. Accordingly, the alert may trigger the I/O interface 308 to present a map of the venue 100 that indicates a current position of the RFID tag 210 as determined based upon the RFID tag data. As yet another example, the memory 304 may store a security application configured to send a notification to a communication device associated with security personnel of the venue 100. In this example, the notification may include information stored in the object database 56 associated with the RFID tag 210 to enable the security personnel to conduct a manual investigation. It should be appreciated that the example processing platform 300 may be configured to generate the alert via two or more channels (e.g., applications) contemporaneously.

In some scenarios, the individual may pick up an object and return the object to the shelf. Accordingly, to avoid improperly identifying a potential shrink event, the example processing platform 300 may wait until the RFID tag data indicates that the position of the RFID tag is dynamic (e.g., moved a threshold distance) before comparing the current RFID tag data to the historical baseline data. Similarly, the example processing platform 300 may detect that the change in RFID tag data occurred for a threshold amount of time before triggering the alert. In these scenarios, if the object is returned to the shelf and the RFID tag data returns to normal, the example processing platform 300 may abstain from triggering the alert.

In some additional scenarios, the ambient environmental metric changes over time. For example, some objects 110 may be positioned in the venue 100 in a position at which light rays strike for a certain part of the day. Accordingly, if the light rays strike the RFID tag 210 for a sustained period of time, the temperature sensor may detect an increased localized environmental metric that exceeds the change threshold. Thus, the processing platform 300 may determine a time period for which the change in the localized environmental metric occurred. If the period is greater than a threshold amount of time (e.g., 10 minutes, 30 minutes, an hour, etc.), the processing platform 300 may abstain from generating an alert indicative of a potential shrink event. In this scenario, the processing platform 300 may also recalibrate the baseline environmental metric from which the change is determined. On the other hand, if the change is less than the threshold amount of time, the processing platform 300 may generate the alert indicative of the potential shrink event.

In some embodiments, the example processing platform 300 may be configured to perform additional comparisons to further reduce the likelihood of incorrectly identifying a potential shrink event. For example, the venue 100 may include fixed temperature sensors positioned throughout the venue 100. Accordingly, the example processing platform 300 may be configured to obtain temperature values from the fixed temperature sensors via the network interface 306. In this example, in addition or in alternative to comparing the RFID tag data to historical RFID tag data, the processing platform 300 may compare the current RFID tag to the ambient environmental metric obtained by a fixed temperature sensor in the vicinity of the RFID tag 210 (e.g., within the same aisle or zone, within a threshold distance, or another distance metric). If the difference between the RFID tag data and the ambient environmental value measured by the fixed temperature sensor exceeds a predetermined threshold, the processing platform 300 may identify the object as being associated with a potential shrink event.

As another technique to determine the ambient environmental metric, the processing platform 300 may be configured to compare the RFID tag data of the RFID tag 210 exhibiting a dynamic position to RFID tag data from one or more other RFID tags 210 within a predetermined distance threshold (e.g., five feet, ten feet, nearest display unit, objects following the same motion pattern as the RFID tag 210, or other distance metric) from the RFID tag 210. In addition, the ambient environmental metric may be obtained from a mobile sensor not included in an RFID tag 210, such as a sensor included in a shopping cart. In embodiments where multiple other RFID tags 210 and/or other mobile sensors are within the predetermined distance threshold, the processing platform 300 may be configured to average the ambient metric data from the other RFID tags and/or mobile sensors to determine the ambient environmental metric. In some embodiments, the processing platform 300 relies on just the fixed temperature sensors, just mobile temperature sensors (including RFID tags 210), and/or a combination thereof.

Figure 4:
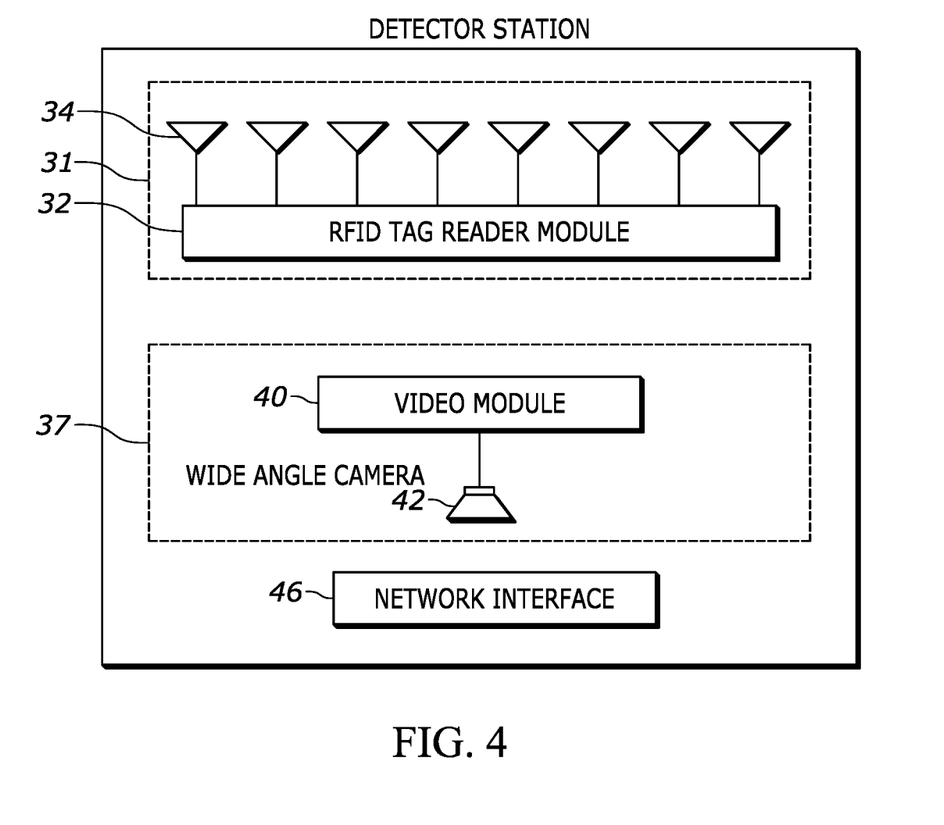
FIG. 4 is a block diagram representative of an example detector station that includes an RFID reader for use in the RFID tracking system.

FIG. 4 is a block diagram representative of an example detector station that includes an RFID reader 31 for use in the RFID tracking system implemented at the venue 100. In the illustrated example, the detector station 30 includes two example detectors 31 and 37, as further described herein. For example, a detector in the form of the RFID tag reader 31 is operative for reading the RFID tags affixed to objects 110.

More particularly, as shown in FIG. 4, each RFID reader 31 includes an RFID tag reader module 32 that has a controller, a memory, and an RF transceiver, which are operatively connected to a plurality of RFID antenna elements 34, which are energized by the RFID module 32 to radiate RF energy (also referred to herein as a beam) over an antenna beam pattern. As those of skill will recognize, an antenna and its beam pattern can be characterized by the antenna's beam width (i.e., the antenna's half power beam width). The RF reader 31 is operated, under the control of the tag reader module 32, to transmit RF beam or wave energy to the RFID tags 210, and to receive RF response signals from the RFID tags 210, thereby interrogating and processing the payloads of the RFID tags 210 that are in a reading zone of the RF transceiver. For example, the payloads may include requested sensor values indicative of the environment proximate to the RFID tags 210. The RFID reading zone for a detector station 30 may be a 360° zone defined by the RFID antenna elements 34 and their collective beam patterns. In various embodiments, a detector 30 my include eight RFID antenna elements 34, each maintained in a fixed position and each having a beam pattern extending in a different direction. During operation, the RF transceiver may capture RFID tag information that identifies RFID tags affixed to objects 110 disposed in the venue 100. The centralized controller 16 may be configured to control the overhead RFID readers 31 in the plurality of detector stations 30 to read the RFID tags affixed to the objects 110.

The RFID transceivers 34 determine a signal strength for the data received from the RFID tags 210. The comparative signal strengths at the each RFID transceiver 34 of a particular detector 30 are used to determine the location (i.e., position) and/or direction of travel of the RFID tag, using a suitable locationing/positioning technique, such as triangulation, trilateration, multilateration, etc. Such locationing and direction of travel may be determined by analyzing data from multiple detector stations 30 and centralized controller 16. The example centralized controller 16 stores the determined location of the RFID tags in the object database 56 in a record corresponding to the object on which the RFID tag 210 is affixed.

In the illustrated example of FIG. 4, the detector station 30 may further include a video detector 37 operative for detecting or locating a target by capturing an image of the target in the venue 100, such as a particular object associated with a potential shrink event alert. More particularly, the video detector 37 may be mounted in each detector station 30 and may include a video module 40 having a camera controller that is connected to a camera 42, which may be, for example, a wide-angle field of view camera for capturing the image of a target. In some embodiments, the camera 42 may be a high-bandwidth, video camera, such as a moving picture expert group (MPEG) compression camera. In some embodiments, the camera may include wide-angle capabilities such that camera 42 would be able to capture images over a large area to produce a video stream of the images. As referred to herein, the image capture devices or video cameras (also referred to as image sensors herein) are configured to capture image data representative of the venue or an environment of the venue. Further, the image sensors described herein are example data capture devices, and example methods and apparatuses disclosed herein are applicable to any suitable type of data capture device(s). In various embodiments, the images or data from the images may be time-stamped and synchronized or fused with other data, such as RFID data, and used to further describe, via data, the venue or environment of the venue. Such synchronized or fused data may be used, for example, by the centralized controller 16 to present user interfaces of a surveillance and/or mapping application supported by the centralized controller 16.

As described, each of the detector stations 30 may collect locationing and direction of travel information (e.g., tracking information) from its one or more detectors, such as the RFID reader 31. That information may be correlated with the video detector 37 to capture and filter video images based on the location and/or direction of travel of the individual.

Any of the detector stations 30, including alone, together, or some combination thereof, may transmit electronic information, including any RFID tag data, image, or other information, to the centralized controller 16 for processing. For example, the central controller 16 of FIG. 1 may include a network communication interface 306 communicatively coupled to network communication interfaces 46 of the detector stations 30 to receive sensing detector data, such as RFID tag data, and image data, such as a video stream from the wide-angle camera 42. If the sensing detector data includes image data, the centralized controller 16 may store the image data at the object database 56. The detector stations 30 may also receive information, commands, or execution instructions, including requests to provide additional sensory or detection information from the centralized controller 16 in order to perform the features and functionally as described herein.

Figure 5:
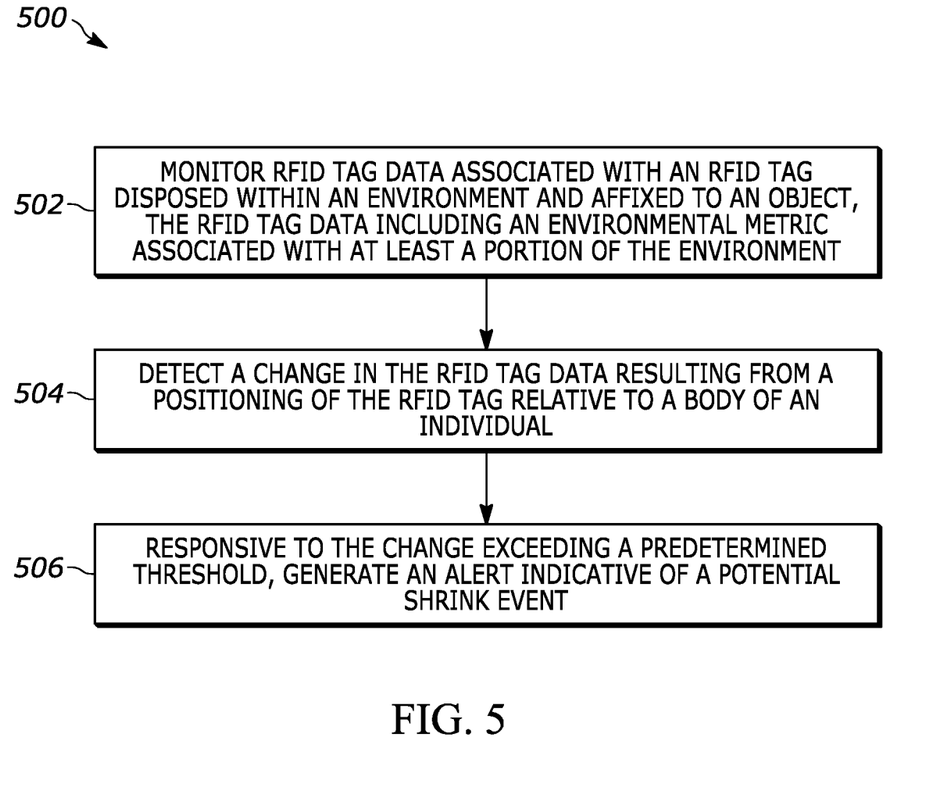
FIG. 5 illustrates an example flow diagram that implements the potential shrink event identification techniques described herein.

FIG. 5 illustrates an example flow diagram 500 that implements the potential shrink event identification techniques described herein. In an embodiment, the flow diagram is implemented by the processing platform 300 of FIG. 3. As described above, in an embodiment, the processing platform 300 forms at least a portion of the controller 16 of FIG. 1. Accordingly, the processing platform is operatively coupled to a plurality of RFID readers, including RFID readers 31 incorporated into detector stations 30.

The method 500 begins at block 502 when the processing platform monitors RFID tag data associated with an RFID tag 210 disposed within an environment (e.g., the venue 100) and affixed to objects 110. The RFID tag data includes an environmental metric associated with at least a portion of the environment. For example, the environmental metric may include at least one of a temperature, a pressure, and a dielectric. As described above, the processing platform may be configured to obtain the RFID tag data from the RFID readers via a network interface (e.g., the network interface 306).

At block 504, the processing platform detects a change in the RFID tag data resulting from a positioning of the RFID tag 212 relative to a body of an individual. For example, as described above, the body of the individual may raise the temperature sensed by the RFID tag 212, apply pressure to the RFID tag 212, and/or secrete moisture that causes a dielectric effect sensed by the RFID tag 212. In some embodiments, the processing platform receives the RFID tag data that includes the environmental metric in response to periodically or aperiodically requesting that the RFID tag 212 reports the environmental metric.

At block 506, the processing platform generates an alert indicative of a potential shrink event responsive to the change exceeding a predetermined threshold. For example, if the environmental metric is indicative of temperature, the threshold may be two degrees Fahrenheit, five degrees Fahrenheit, ten degrees Fahrenheit, one degree Celsius, three degrees Celsius, and/or another threshold temperature. In some embodiments, the predetermined threshold temperature varies depending upon the location in the venue 100 in which the RFID 212 is positioned. For example, the predetermined temperature threshold may be higher for RFID tags positioned in a refrigerated section as opposed to an unrefrigerated section. If the predetermined threshold relates to pressure and/or dielectric effects, the RFID tag 212 may normalize the environmental metric to a standard scale (e.g., 1-5, 1-10, 1-100, etc.) to reflect the amount the impedance of the programmable capacitor shifted in response to the sensed pressure and/or dielectric effect. Accordingly, in addition to appropriate thresholds based on traditional pressure and/or dielectric values, the predetermined threshold may be defined based on the normalized scale. These values are readily tunable by those skilled in the art upon obtaining sample sensor RFID tag data. In some embodiments, the processing platform includes multiple thresholds configured to detect different types of potential shrink events.

As described above, the processing platform may determine the magnitude of the change based on different baseline values. In some embodiments, the processing platform determines the change relative to historical RFID tag data for the RFID tag 212 (e.g., with respect to a steady state environmental value when the object 110 is at rest on a shelf). Additionally or alternatively, the processing platform may determine the change relative to an ambient environmental metric in a vicinity of the object. For example the ambient environmental metric may be obtain from at least one second RFID tag positioned within a predetermined distance threshold from the RFID tag 212. In this example, the ambient environmental metric may be obtained by averaging the RFID tag data obtained from the at least one second RFID tag.

In some embodiments, the processing platform is configured to generate the alert responsive to the change in the RFID tag data occurring over a predetermined period of time. For example the time may be ten seconds, thirty seconds, a minute, five minutes, and so on. In some embodiments, the predetermined period of time is defined with respect to a change in position of the RFID tag 212. That is, in some embodiments, the predetermined period of time is based on when the processing platform determines that the RFID 212 is exhibiting a dynamic position (e.g., the RFID tag 212 moved a threshold distance from the shelf on which the object 110 is positioned). If the processing platform determines that the RFID tag does not exceed the predetermined threshold and/or exceed the predetermined threshold for the predetermined period of time, the processing platform abstains from generating the alert indicative of the potential shrink event. Otherwise, to generate the alert, the processing platform may initiate at least one of video monitoring and map monitoring of the object. For example, the processing platform may launch a user interface of a surveillance and/or map application stored at a memory to present a visual indication of the potential shrink event. In some embodiments, the memory is included in the processing platform (e.g., the memory 304 of FIG. 3). In other embodiments, the memory is included in a communication device carried by venue personnel. In these embodiments, the processing platform may wireless communicate the alert to the communication device.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed:

1. A radio frequency (RF) identification (RFID) tracking system for detecting potential shrink events within a venue, the RFID tracking system comprising:
   a plurality of RFID readers disposed throughout the venue; and
   a controller operatively coupled to the plurality of RFID readers, the controller including at least one processor and at least one non-transitory machine-readable memory storing machine-readable instructions that, when executed by the at least one processor, cause the RFID tracking system to:
      monitor RFID tag data associated with an RFID tag disposed within an environment and affixed to an object, the RFID tag data including an environmental metric associated with at least a portion of the environment; and
      responsive to a change in the RFID tag data exceeding a predetermined threshold, generate an alert indicative of a potential shrink event,
   wherein the change in the RFID tag data includes a change in the environmental metric resulting from a positioning of the RFID tag relative to a body of an individual.

2. The RFID tracking system of claim 1, wherein the machine-readable instructions further cause the RFID tracking system to generate the alert indicative of the potential shrink event further responsive to the change in the RFID tag data occurring over a predetermined period of time.

3. The RFID tracking system of claim 1, wherein the change in the RFID tag data is determined relative to historical RFID tag data.

4. The RFID tracking system of claim 1, wherein the environmental metric includes at least one of a temperature, a pressure, and a dielectric.

5. The RFID tracking system of claim 1, wherein the change in the environmental metric is determined relative to an ambient environmental metric in a vicinity of the object.

6. The RFID tracking system of claim 5, wherein the ambient environmental metric is obtained from at least one second RFID tag positioned within a predetermined distance threshold from the RFID tag affixed to the object.

7. The RFID tracking system of claim 5, wherein the ambient environmental metric is determined by averaging respective second RFID tag data obtained from the at least one second RFID tag.

8. The RFID tracking system of claim 1, wherein the machine-readable instructions further cause the RFID tracking system to, responsive to the change in the RFID tag data not exceeding the predetermined threshold, abstain from generating the alert indicative of the potential shrink event.

9. The RFID tracking system of claim 1, wherein the machine-readable instructions further cause the RFID tracking system to:
   track location data of the RFID tag; and
   generate the alert indicative of the potential shrink event further responsive to the location data indicating a dynamic position of the RFID tag.

10. The RFID tracking system of claim 1, wherein the machine-readable instructions further cause the RFID tracking system to, responsive to the change in the RFID tag data exceeding the predetermined threshold, initiate at least one of video monitoring and map monitoring of the object.

11. A radio frequency (RF) identification (RFID) tracking system for detecting potential shrink events within a venue, the RFID tracking system comprising:
   a plurality of RFID readers disposed throughout the venue; and
   a controller operatively coupled to the plurality of RFID readers, the controller including at least one processor and at least one non-transitory machine-readable memory storing machine-readable instructions that, when executed by the at least one processor, cause the RFID tracking system to:
      monitor RFID tag data associated with an RFID tag disposed within an environment and affixed to an object, the RFID tag data including temperature data associated with at least a portion of the environment; and
      responsive to a change in the RFID tag data exceeding a predetermined threshold, generate an alert indicative of a potential shrink event,
   wherein the change in the RFID tag data includes a change in the temperature data resulting from a positioning of the RFID tag relative to a body of an individual.

12. The RFID tracking system of claim 11, wherein the machine-readable instructions further cause the RFID tracking system to generate the alert indicative of the potential shrink event further responsive to the change in the RFID tag data occurring over a predetermined period of time.

13. The RFID tracking system of claim 11, wherein the change in the RFID tag data is determined relative to an ambient environmental metric in a vicinity of the object.

14. The RFID tracking system of claim 11, wherein the machine-readable instructions further cause the RFID tracking system to, responsive to the change in the RFID tag data not exceeding the predetermined threshold, abstain from generating the alert indicative of the potential shrink event.

15. The RFID tracking system of claim 11, wherein the machine-readable instructions further cause the RFID tracking system to:
   track location data of the RFID tag; and
   generate the alert indicative of the potential shrink event further responsive to the location data indicating a dynamic position of the RFID tag.

16. A radio frequency (RF) identification (RFID) tracking system for detecting potential shrink events within a venue, the RFID tracking system comprising:
   a plurality of RFID readers disposed throughout the venue; and
   a controller operatively coupled to the plurality of RFID readers, the controller including at least one processor and at least one non-transitory machine-readable memory storing machine-readable instructions that, when executed by the at least one processor, cause the RFID tracking system to:
      monitor RFID tag data associated with an RFID tag disposed within an environment and affixed to an object, the RFID tag data including environment dielectric data associated with at least a portion of the environment; and
      responsive to a change in the RFID tag data exceeding a predetermined threshold, generate an alert indicative of a potential shrink event, wherein the change in the RFID tag data includes a change in the environment dielectric resulting from a positioning of the RFID tag relative to a body of an individual.

17. The RFID tracking system of claim 16, wherein the machine-readable instructions further cause the RFID tracking system to generate the alert indicative of the potential shrink event further responsive to the change in the RFID tag data occurring over a predetermined period of time.

18. The RFID tracking system of claim 16, wherein the machine-readable instructions further cause the RFID tracking system to, responsive to the change in the RFID tag data not exceeding the predetermined threshold, abstain from generating the alert indicative of the potential shrink event.

19. The RFID tracking system of claim 16, wherein the machine-readable instructions further cause the RFID tracking system to:
   track location data of the RFID tag; and
   generate the alert indicative of the potential shrink event further responsive to the location data indicating a dynamic position of the RFID tag.

20. A method of tracking radio frequency identification (RFID) tags at a venue having a plurality of RFID readers disposed throughout the venue by a controller operatively coupled to the plurality of RFID readers, the method including:
   monitoring, by a processing platform, RFID tag data associated with an RFID tag disposed within an environment and affixed to an object, the RFID tag data including an environmental metric associated with at least a portion of the environment;
   detecting, by a processing platform, a change in the RFID tag data resulting from a positioning of the RFID tag relative to a body of an individual; and
   responsive to the change exceeding a predetermined threshold, generating, by a processing platform, an alert indicative of a potential shrink event.

21. The method of claim 20, wherein generating the alert indicative of the potential shrink event occurs further responsive to the change in the RFID tag data occurring over a predetermined period of time.

22. The RFID tracking system of claim 20, wherein the environmental metric includes at least one of a temperature, a pressure, and a dielectric.

* * * * *